United States Patent
Geens et al.

(10) Patent No.: US 10,254,496 B2
(45) Date of Patent: Apr. 9, 2019

(54) TELECOMMUNICATIONS PANEL ASSEMBLY WITH MOVABLE ADAPTERS

(71) Applicant: CommScope Connectivity Belgium BVBA, Kessel-Lo (BE)

(72) Inventors: Johan Geens, Bunsbeek (BE); Pieter Vermeulen, Westerlo (BE); Bart Vos, Geel (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 0 days.

(21) Appl. No.: 15/568,753

(22) PCT Filed: Apr. 22, 2016

(86) PCT No.: PCT/EP2016/059105
§ 371 (c)(1),
(2) Date: Oct. 23, 2017

(87) PCT Pub. No.: WO2016/170173
PCT Pub. Date: Oct. 27, 2016

(65) Prior Publication Data
US 2018/0164524 A1    Jun. 14, 2018

Related U.S. Application Data

(60) Provisional application No. 62/151,722, filed on Apr. 23, 2015, provisional application No. 62/186,001, filed on Jun. 29, 2015.

(51) Int. Cl.
*G02B 6/44* (2006.01)
*G02B 6/38* (2006.01)
*G02B 6/43* (2006.01)

(52) U.S. Cl.
CPC ......... *G02B 6/4452* (2013.01); *G02B 6/3897* (2013.01); *G02B 6/43* (2013.01); *G02B 6/4455* (2013.01)

(58) Field of Classification Search
None
See application file for complete search history.

(56) References Cited

U.S. PATENT DOCUMENTS 4,708,430 A    11/1987   Donaldson et al.
4,792,203 A    12/1988   Nelson et al.
(Continued)

FOREIGN PATENT DOCUMENTS

DE    43 29 184 A1    3/1995
DE    44 13 136 C1    5/1995
(Continued)

OTHER PUBLICATIONS

International Search Report and Written Opinion of the International Searching Authority for corresponding International Patent Application No. PCT/EP2016/059105 dated Jul. 7, 2016, 4 pages.
(Continued)

*Primary Examiner* — Michael Stahl
(74) *Attorney, Agent, or Firm* — Merchant & Gould P.C.

(57) ABSTRACT

A telecommunications panel assembly (10) includes a chassis (14) defining a front (16), a top (20), a bottom (22), and two sides (24) and a plurality of adapter mounting modules (26) mounted to the chassis (14) at the front (16), each adapter mounting module (26) including a plurality of fiber optic adapters (36) mounted in a line. At least one of the adapter mounting modules (26) is mounted to the chassis (14) with a pair of supports (50) that are pivotable with respect to the at least one adapter module (26) such that the at least one adapter module (26) is removable from the chassis (14) and remountable at a position spaced linearly apart from another of the adapter mounting modules (26), wherein all of the adapter mounting modules (26) are also pivotally mounted about horizontal rotation axes (42)
(Continued)

extending parallel to the top (20) and bottom (22) and transversely to the sides (24).

17 Claims, 13 Drawing Sheets

(56) References Cited

U.S. PATENT DOCUMENTS

| | | | |
|---|---|---|---|
| 4,912,615 | A | 3/1990 | Bluband |
| 4,995,681 | A | 2/1991 | Parnell |
| 5,142,606 | A | 8/1992 | Carney et al. |
| 5,266,272 | A | 11/1993 | Griner et al. |
| 5,339,379 | A | 8/1994 | Kutsch et al. |
| 5,402,515 | A | 3/1995 | Vidacovich et al. |
| 5,497,444 | A | 3/1996 | Wheeler |
| 5,584,396 | A | 12/1996 | Schmitt |
| 5,717,810 | A | 2/1998 | Wheeler |
| 5,730,400 | A | 3/1998 | Rinderer et al. |
| 5,740,299 | A | 4/1998 | Llewellyn et al. |
| 5,758,003 | A | 5/1998 | Wheeler et al. |
| 5,778,131 | A | 7/1998 | Llewellyn et al. |
| 5,870,519 | A | 2/1999 | Jenkins et al. |
| 5,946,440 | A | 8/1999 | Puetz |
| 5,966,492 | A | 10/1999 | Bechamps et al. |
| 6,160,946 | A | 12/2000 | Thompson et al. |
| 6,234,240 | B1 | 5/2001 | Cheon |
| 6,263,141 | B1 | 7/2001 | Smith |
| 6,272,009 | B1 | 8/2001 | Buican et al. |
| 6,301,424 | B1 | 10/2001 | Hwang |
| 6,418,264 | B1 | 7/2002 | Hough et al. |
| 6,427,045 | B1 | 7/2002 | Matthes et al. |
| 6,438,310 | B1 | 8/2002 | Lance et al. |
| 6,442,022 | B1 | 8/2002 | Paul |
| 6,529,373 | B1 | 3/2003 | Liao et al. |
| 6,538,879 | B2 | 3/2003 | Jiang |
| 6,540,083 | B2 | 4/2003 | Shih |
| 6,556,763 | B1 | 4/2003 | Puetz et al. |
| 6,560,099 | B1 | 5/2003 | Chang |
| 6,591,051 | B2 | 7/2003 | Solheid et al. |
| 6,600,665 | B2 | 7/2003 | Lauchner |
| 6,631,237 | B2 | 10/2003 | Knudsen et al. |
| RE38,311 | E | 11/2003 | Wheeler |
| 6,738,261 | B2 | 5/2004 | Vier et al. |
| 6,760,531 | B1 | 7/2004 | Solheid et al. |
| 6,788,544 | B1 | 9/2004 | Barsun et al. |
| 6,788,786 | B1 | 9/2004 | Kessler et al. |
| 6,810,194 | B2 | 10/2004 | Griffiths et al. |
| 6,850,685 | B2 | 2/2005 | Tinucci et al. |
| 6,870,734 | B2 | 3/2005 | Mertesdorf et al. |
| 6,902,069 | B2 | 6/2005 | Hartman et al. |
| 6,925,241 | B2 | 8/2005 | Bohle et al. |
| 6,944,383 | B1 | 9/2005 | Herzog et al. |
| 6,944,387 | B2 | 9/2005 | Howell et al. |
| 7,079,744 | B2 | 7/2006 | Douglas et al. |
| 7,086,539 | B2 | 8/2006 | Knudsen et al. |
| 7,090,084 | B2 | 8/2006 | Knudsen et al. |
| 7,102,884 | B2 | 9/2006 | Mertesdorf et al. |
| 7,142,765 | B2 | 11/2006 | Raap et al. |
| 7,302,154 | B2 | 11/2007 | Trebesch et al. |
| 7,349,615 | B2 | 3/2008 | Frazier et al. |
| 7,408,769 | B2 | 8/2008 | Mertesdorf et al. |
| 7,460,758 | B2 | 12/2008 | Xin |
| 7,478,730 | B2 | 1/2009 | Knudsen et al. |
| 7,527,226 | B2 | 5/2009 | Kusuda et al. |
| 7,856,166 | B2 | 12/2010 | Biribuze et al. |
| 8,002,123 | B2 | 8/2011 | Knudsen et al. |
| 8,019,191 | B2 | 9/2011 | Laurisch |
| 8,144,457 | B2 | 3/2012 | Mertesdorf et al. |
| 8,315,498 | B2 | 11/2012 | Redmann et al. |
| 8,331,752 | B2 | 12/2012 | Biribuze et al. |
| 8,417,074 | B2 | 4/2013 | Nhep et al. |
| 8,556,356 | B2 * | 10/2013 | Anderson ............ G02B 6/4452 211/26 |
| 8,879,881 | B2 | 11/2014 | Cote et al. |
| 8,991,623 | B2 | 3/2015 | Knudsen et al. |
| 9,038,832 | B2 * | 5/2015 | Hernandez-Ariguznaga ............... H05K 7/16 211/26 |
| 9,081,164 | B2 | 7/2015 | Badar et al. |
| 9,128,262 | B2 | 9/2015 | Campbell et al. |
| 9,494,759 | B2 | 11/2016 | Claessens et al. |
| 9,529,171 | B2 | 12/2016 | Knudsen et al. |
| 9,664,870 | B2 | 5/2017 | Trebesch et al. |
| 9,715,075 | B2 | 7/2017 | Solheid et al. |
| 9,823,432 | B2 | 11/2017 | Alexi et al. |
| 2002/0125800 | A1 | 9/2002 | Knudsen et al. |
| 2002/0159745 | A1 | 10/2002 | Howell et al. |
| 2002/0179485 | A1 | 12/2002 | Shih |
| 2002/0191942 | A1 | 12/2002 | Griffiths et al. |
| 2003/0086675 | A1 | 5/2003 | Wu et al. |
| 2004/0074852 | A1 | 4/2004 | Knudsen et al. |
| 2004/0079711 | A1 | 4/2004 | Hartman et al. |
| 2004/0251220 | A1 | 12/2004 | Mertesdorf et al. |
| 2006/0118497 | A1 | 6/2006 | Knudsen et al. |
| 2006/0275008 | A1 | 12/2006 | Xin |
| 2007/0127201 | A1 | 6/2007 | Mertesdorf et al. |
| 2007/0230889 | A1 | 10/2007 | Sato et al. |
| 2008/0152416 | A1 | 7/2008 | Heaton et al. |
| 2008/0205843 | A1 | 8/2008 | Castonguay et al. |
| 2009/0129045 | A1 | 5/2009 | Mertesdorf et al. |
| 2009/0257726 | A1 | 10/2009 | Redmann et al. |
| 2009/0270832 | A1 | 10/2009 | Vancaillie et al. |
| 2010/0012599 | A1 | 1/2010 | Knudsen et al. |
| 2010/0054681 | A1 | 3/2010 | Biribuze et al. |
| 2010/0310225 | A1 | 12/2010 | Anderson et al. |
| 2011/0085776 | A1 | 4/2011 | Biribuze et al. |
| 2011/0297629 | A1 | 12/2011 | Knudsen et al. |
| 2013/0170810 | A1 | 7/2013 | Badar et al. |
| 2013/0322839 | A1 | 12/2013 | Claessens et al. |
| 2014/0248028 | A1 | 9/2014 | Campbell et al. |
| 2014/0376870 | A1 | 12/2014 | Takeuchi et al. |
| 2015/0234142 | A1 | 8/2015 | Courchaine et al. |
| 2016/0124160 | A1 | 5/2016 | Verheyden et al. |
| 2017/0227728 | A1 | 8/2017 | Claessens et al. |
| 2017/0235077 | A1 | 8/2017 | Knudsen et al. |
| 2017/0276892 | A1 | 9/2017 | Geling et al. |
| 2017/0276893 | A1 | 9/2017 | Geling et al. |
| 2017/0293099 | A1 | 10/2017 | Alexi et al. |

FOREIGN PATENT DOCUMENTS

| | | |
|---|---|---|
| EP | 0 215 668 A2 | 3/1987 |
| EP | 0 293 183 A2 | 11/1988 |
| EP | 0 594 913 A1 | 5/1994 |
| EP | 0 740 803 A1 | 11/1996 |
| EP | 1 203 974 A2 | 5/2002 |
| EP | 1 986 280 A2 | 10/2008 |
| EP | 2 159 617 A2 | 3/2010 |
| EP | 2 772 780 A1 | 9/2014 |
| EP | 2 775 334 A1 | 9/2014 |
| FR | 2 959 383 A1 | 10/2011 |
| WO | 99/42881 A1 | 8/1999 |
| WO | 02/19005 A2 | 3/2002 |
| WO | 02/21182 A1 | 3/2002 |
| WO | 02/071767 A2 | 9/2002 |
| WO | 2008/149131 A2 | 12/2008 |
| WO | 2011/100613 A1 | 8/2011 |
| WO | 2014/096134 A1 | 6/2014 |

OTHER PUBLICATIONS

ADC Telecommunications, Inc., FL2000 Products Catalog, Literature No. 803, front cover, table of contents, pp. 1-32, rear cover (Dec. 2000).

ADC Telecommunications, Inc., Next Generation Frame Product Family Ordering Guide, Literature No. 820, front cover, table of contents, pp. 1-43, rear cover (Apr. 2002).

* cited by examiner

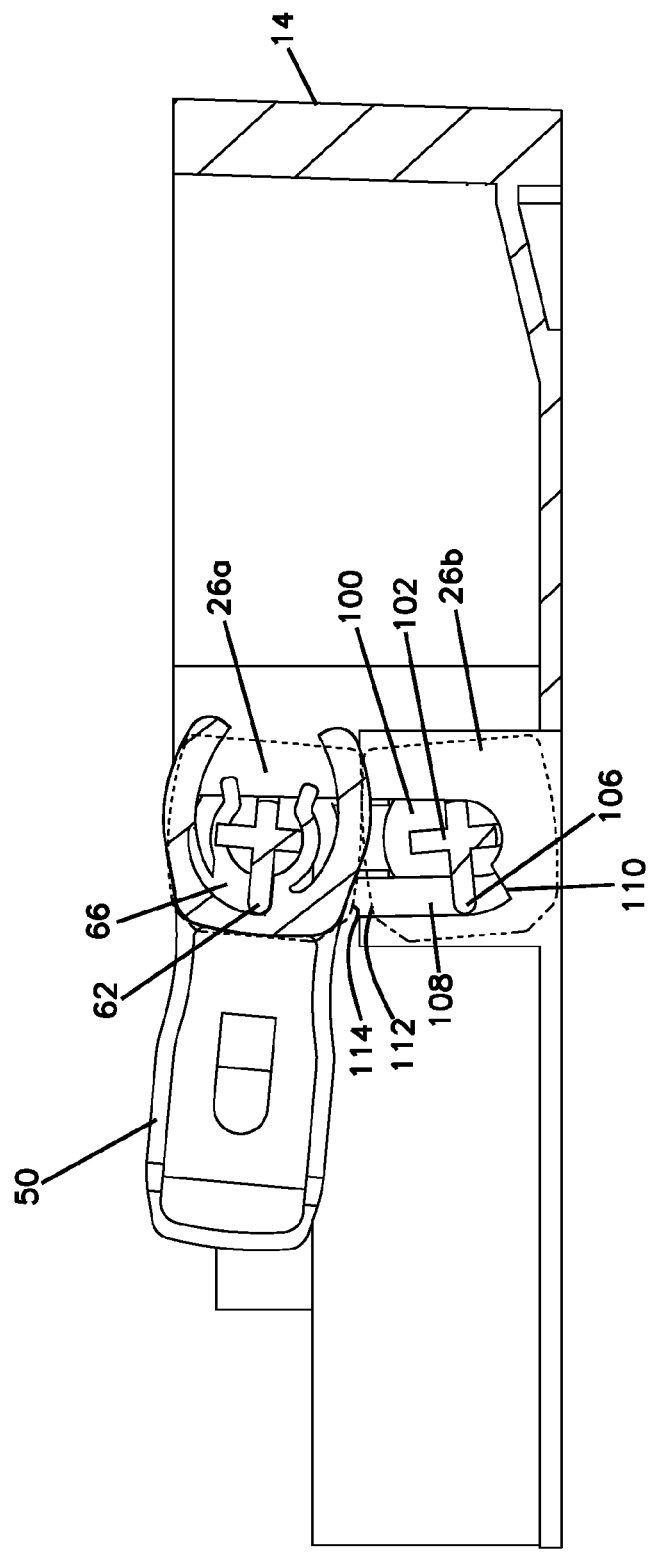

US 10,254,496 B2

TELECOMMUNICATIONS PANEL ASSEMBLY WITH MOVABLE ADAPTERS

CROSS REFERENCE TO RELATED APPLICATIONS

This application is a National Stage Application of PCT/EP2016/059105, filed on Apr. 22, 2016, which claims the benefit of U.S. Patent Application Ser. No. 62/186,001, filed on Jun. 29, 2015 and claims the benefit of U.S. Patent Application Ser. No. 62/151,722, filed on Apr. 23, 2015, the disclosures of which are incorporated herein by reference in their entireties. To the extent appropriate, a claim of priority is made to each of the above disclosed applications.

TECHNICAL FIELD

This disclosure relates to fiber optic termination panels.

BACKGROUND OF THE INVENTION

With respect to telecommunications cable termination panels, there is an ever increasing need to increase density. The cable termination panels of the prior art include adapters, which hold mating connectors of a fiber optic transmission pathway.

By increasing density, more terminations can be located in a given area, such as on a rack or in a cabinet. However, by increasing the density, connector access becomes more difficult for a technician needing to make a new connection, or make a disconnection, such as to clean a connector, or move to a new adapter.

SUMMARY OF THE INVENTION

The present invention concerns a telecommunications panel assembly including a chassis defining an open front, and a main body including a top, a bottom, and two sides. A plurality of adapter mounting modules are mounted to the front. Each adapter mounting module includes a plurality of fiber optic adapters mounted in a line. At least one of the adapter mounting modules is pivotally or rotatably mounted with respect to another module at a different row about a horizontal rotation axis extending parallel to the top and bottom, and transversely to the sides of the chassis for improved connector access. According to one embodiment, one of the adapter mounting modules may also be liftable with respect to another module at a different row for improving access to the back side of the adapter module of the lower row. The chassis may include cable management fingers associated with each of the rows for guiding cables to a larger radius limiter at one of the sides, adjacent to the front of the chassis.

In one embodiment, each of the adapters is mounted at an angle to the adapter mounting modules to direct the cables extending therefrom toward the radius limiter at one of the sides of the chassis.

Methods of use are also provided.

According to one aspect, the telecommunications panel assembly comprises a chassis including a front, the chassis further defining a top, a bottom, and two sides. A plurality of adapter mounting modules are mounted to the chassis at the front, each adapter mounting module including a plurality of fiber optic adapters mounted in a line. At least one of the adapter mounting modules is pivotally mounted about a horizontal rotation axis extending parallel to the top and bottom, and transversely to the sides, wherein the at least one pivotable adapter mounting module is rotatable in either an upward or a downward direction. A cable guide or radius limiter associated with one of the sides is adjacent to the front of the chassis.

According to another aspect, the disclosure is directed to a telecommunications panel assembly comprising a chassis including a front, the chassis further defining a top, a bottom, and two sides and a plurality of adapter mounting modules mounted to the chassis at the front, each adapter mounting module including a plurality of fiber optic adapters mounted in a line. At least one of the adapter mounting modules is mounted to the chassis with a pair of supports that are pivotable with respect to the at least one adapter module such that the at least one adapter module is removable from the chassis and remountable at a position spaced linearly apart from another of the adapter mounting modules.

According to one embodiment, all of the adapter mounting modules are also pivotally mounted about a horizontal rotation axis extending parallel to the top and bottom and transversely to the sides.

According to another aspect, the disclosure is directed to a method of increasing access to adapters of an adapter mounting module mounted to a telecommunications chassis that defines a front, a top, a bottom, and two sides, the method comprising removing an adapter mounting module from the chassis, pivoting a pair of supports that are mounted at right and left sides of the adapter mounting module, and remounting the adapter mounting module to the chassis via the supports at a position spaced linearly apart from another adapter mounting module that is initially adjacent to the remounted adapter module. According to one embodiment, the remounted adapter mounting module is also initially pivotable with respect to the other adapter mounting module about a horizontal rotation axis extending parallel to the top and bottom, and transversely to the sides.

BRIEF DESCRIPTION OF THE FIGURES

FIG. 12 is a cross-sectional view similar to that of FIG. 11, illustrating the frictional interaction of the upper and lower adapter mounting modules when either of the modules is pivoted with respect to the other.

DETAILED DESCRIPTION

Figure 1:
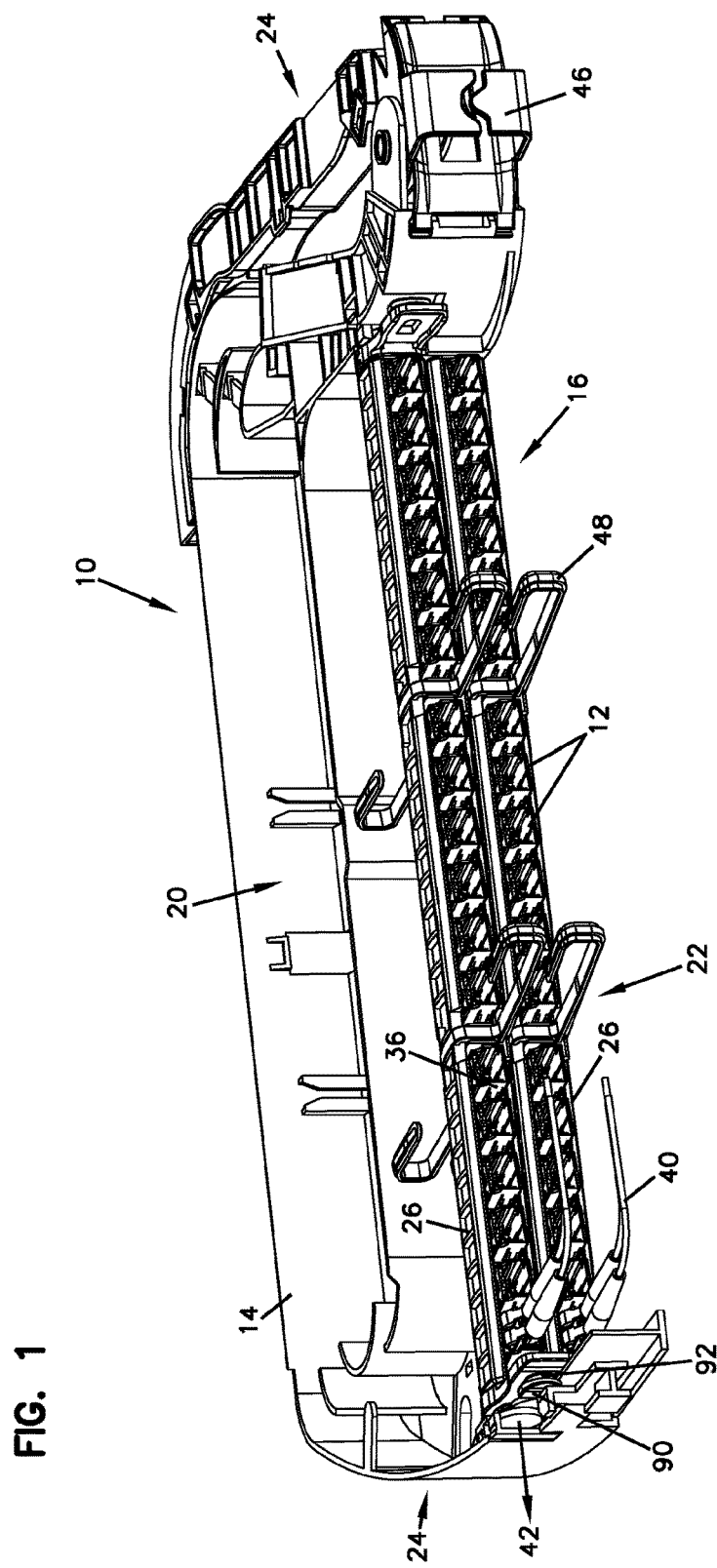
FIG. 1 is a front, top, left side perspective view of a telecommunications panel assembly in accordance with the principles of the present disclosure.
Figure 2:
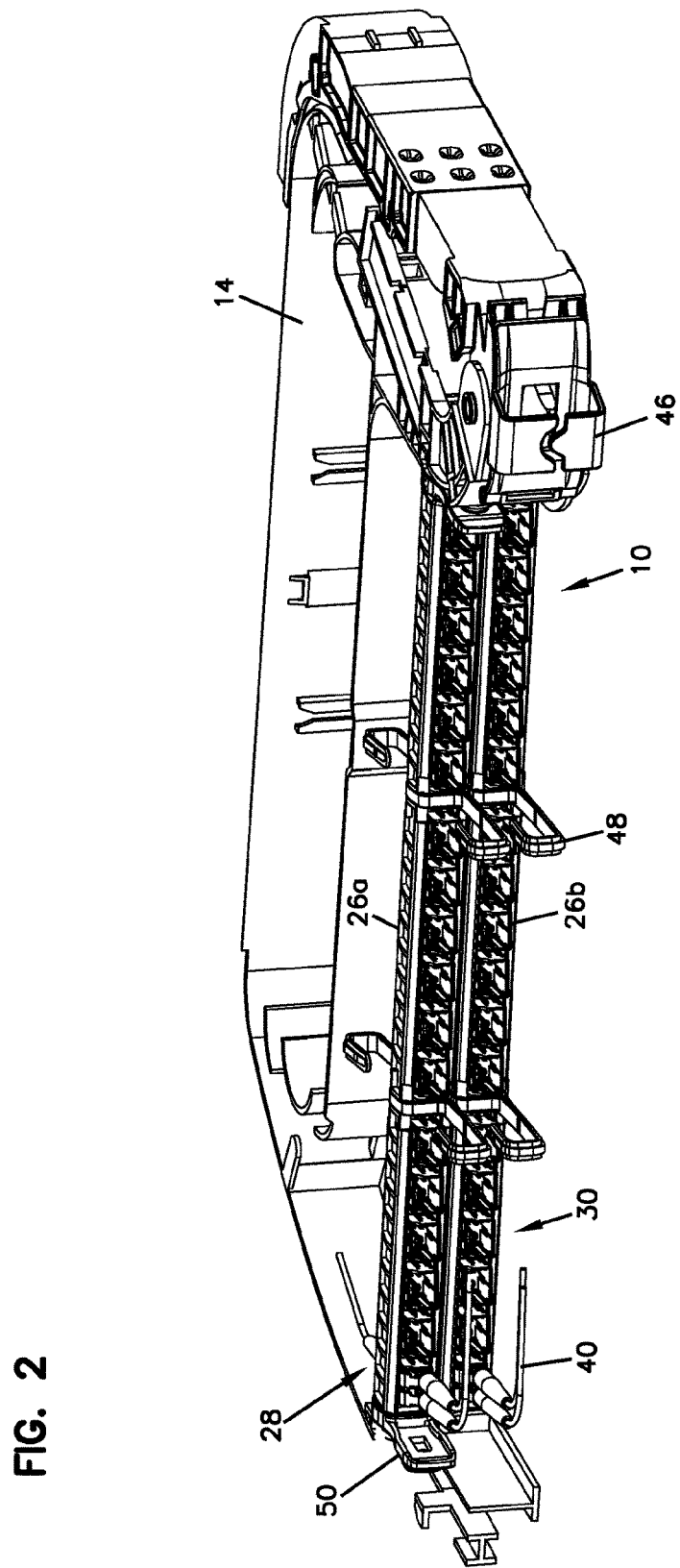
FIG. 2 is a front, top, right side perspective view of the telecommunications panel assembly of FIG. 1.
Figure 3:
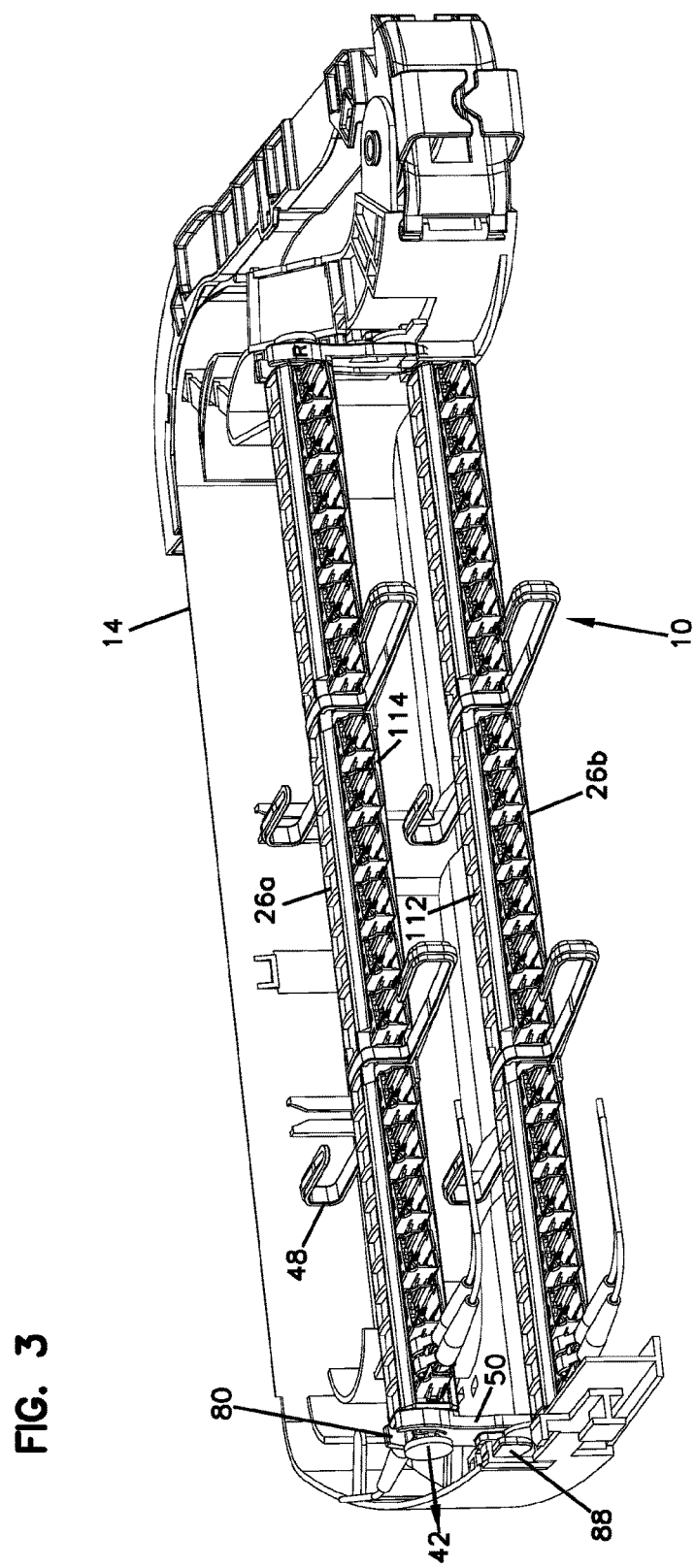
FIG. 3 illustrates the telecommunications panel assembly of FIG. 1 with an upper adapter mounting module of the assembly positioned at a raised configuration.
Figure 4:
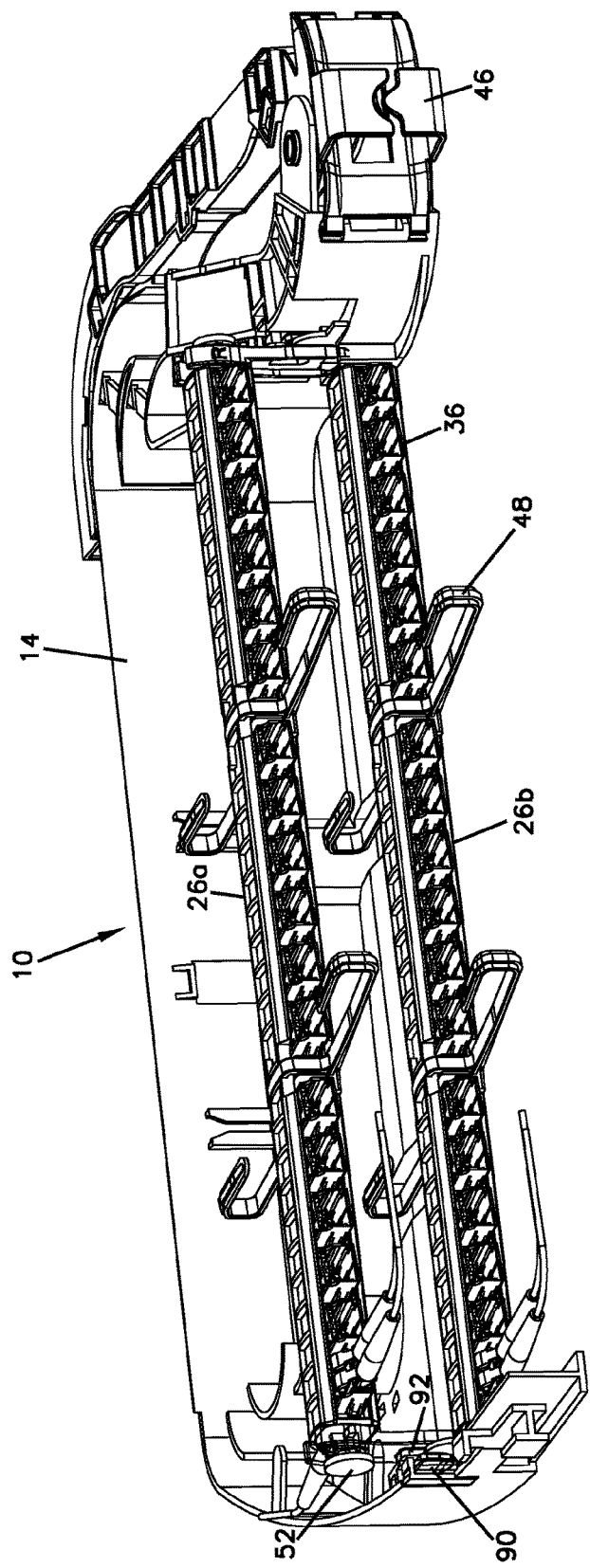
FIG. 4 shows the assembly of FIG. 3 with one of the lift supports of the adapter mounting module in phantom lines to illustrate the positive stop features of the pivot pin of the adapter mounting module.
Figure 4A:
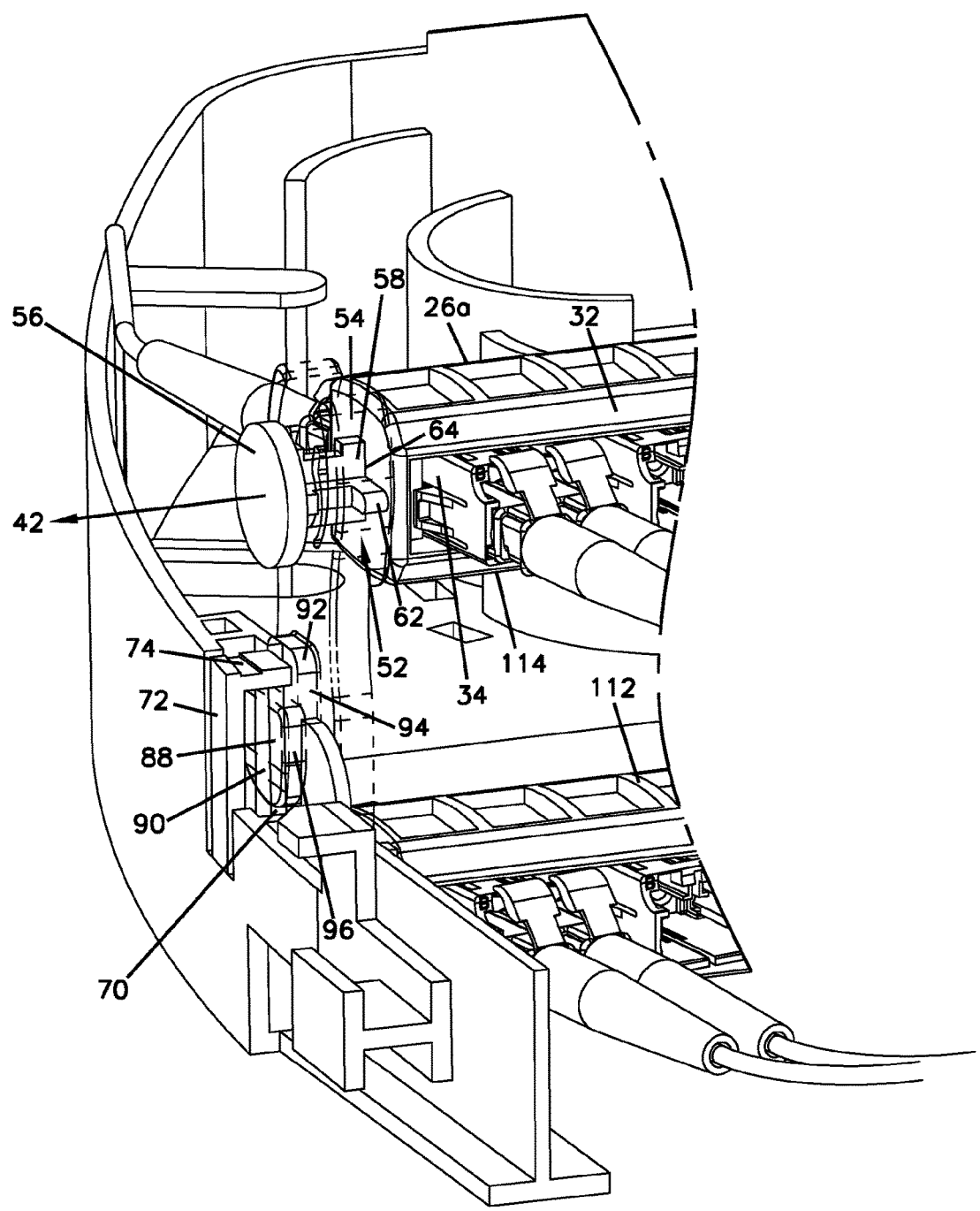
FIG. 4A is a close-up view of a portion of the assembly of FIG. 4 illustrating the pivotable coupling of the lift support to the adapter mounting module.
Figure 5:
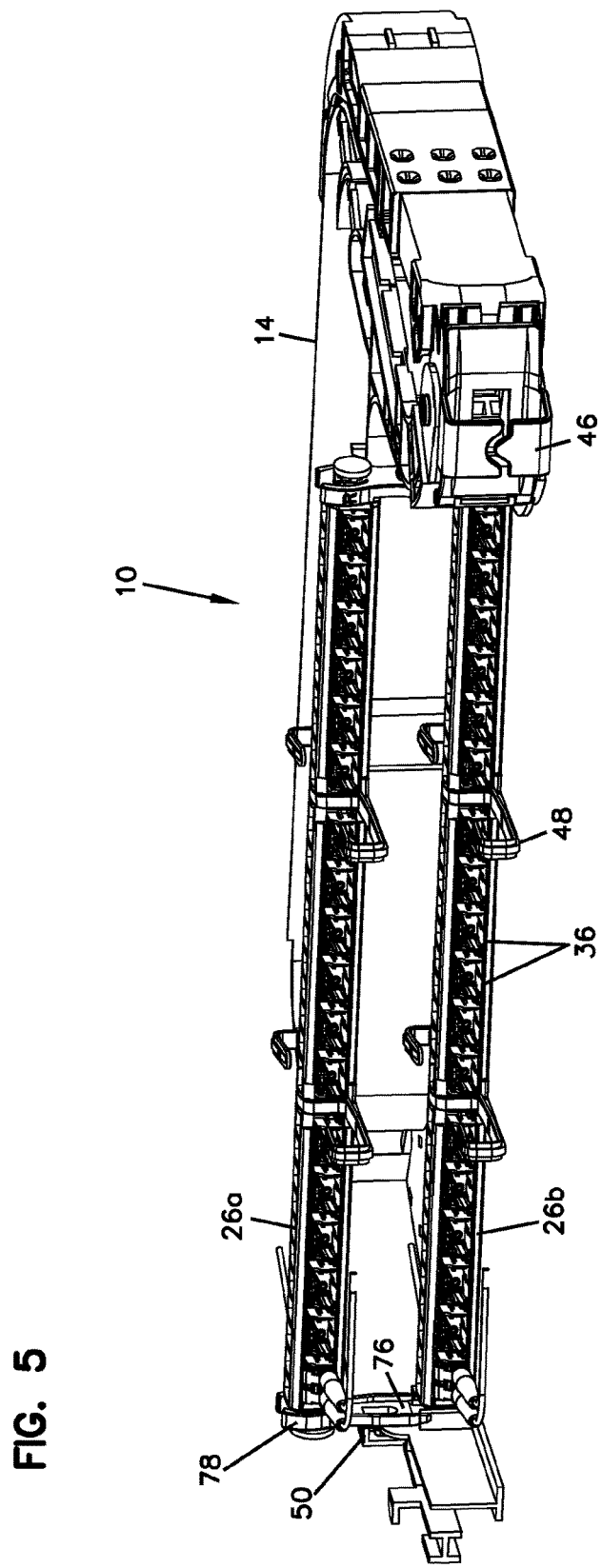
FIG. 5 illustrates the telecommunications panel assembly of FIG. 3 with the upper adapter mounting module of the assembly positioned at a raised configuration from a right perspective view.
Figure 6:
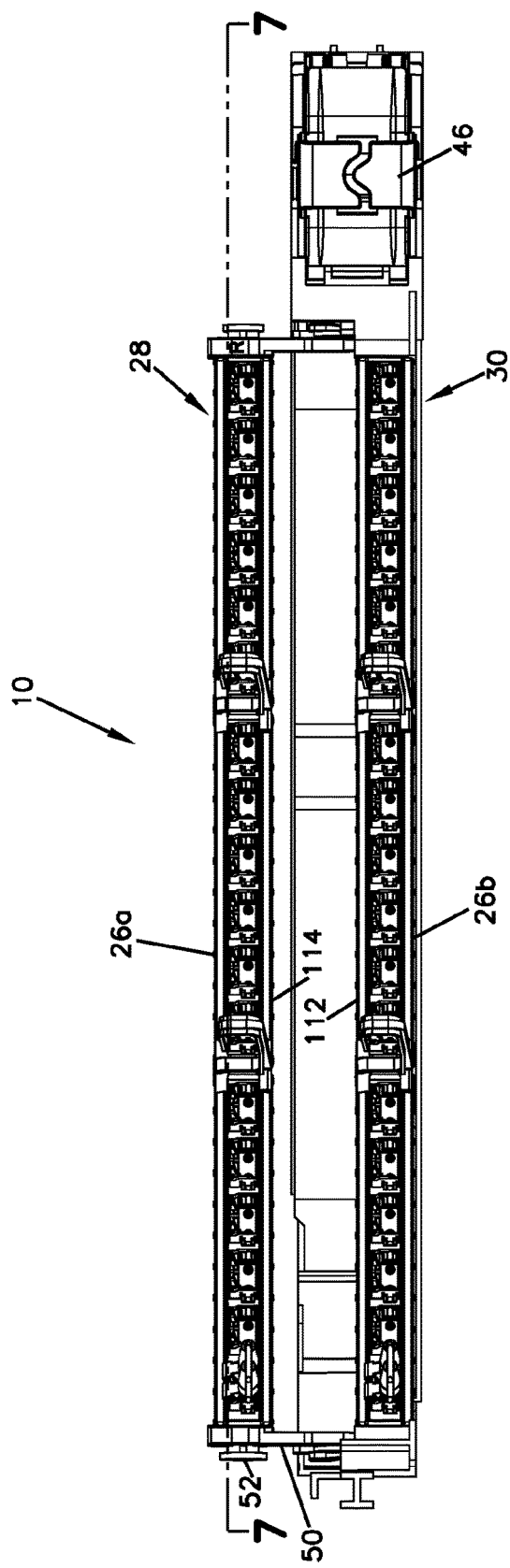
FIG. 6 illustrates the telecommunications panel assembly of FIG. 3 with the upper adapter mounting module of the assembly positioned at a raised configuration from a front view.
Figure 7:
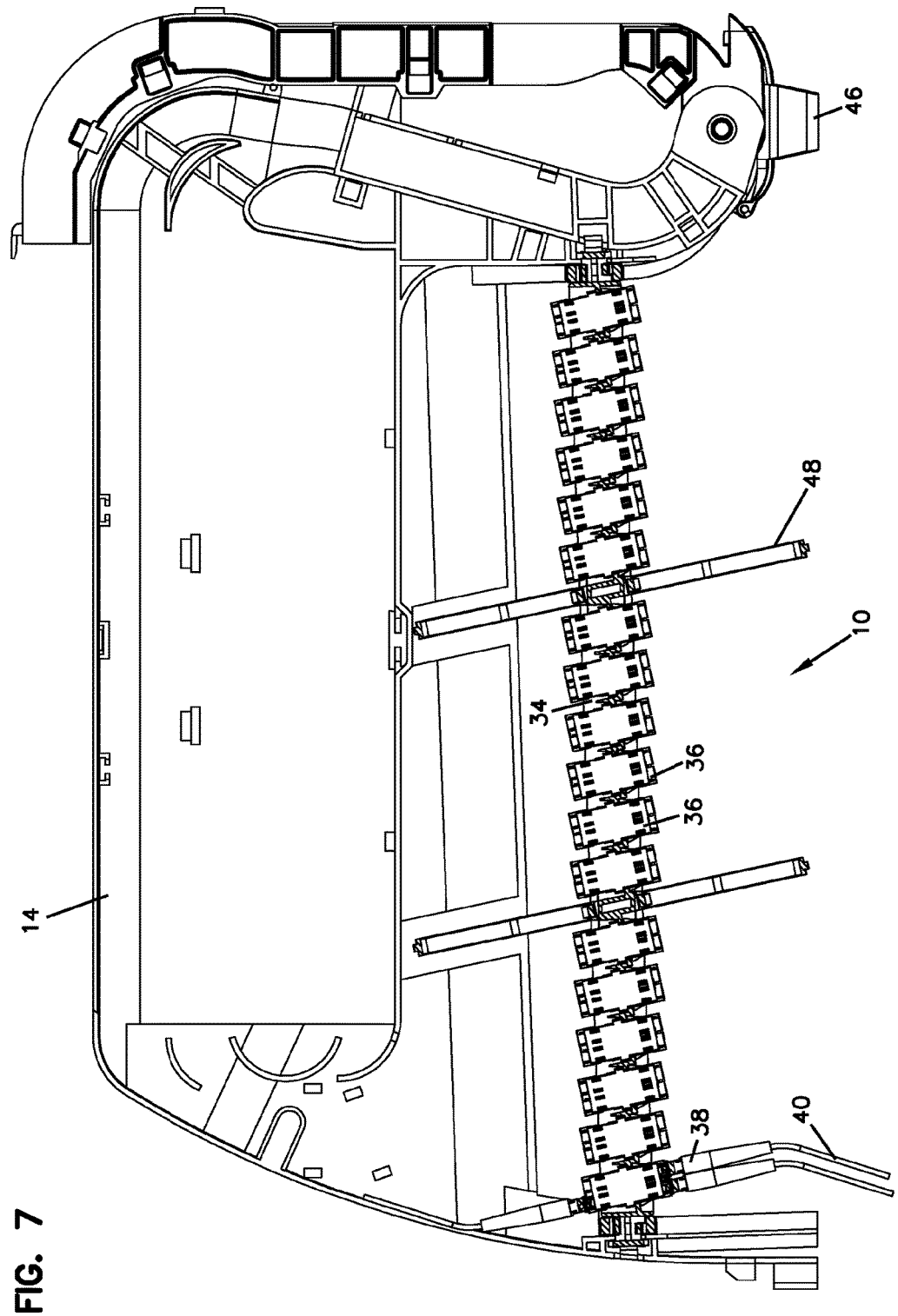
FIG. 7 is a cross-sectional view taken along line 7-7 of FIG. 6.
Figure 8:
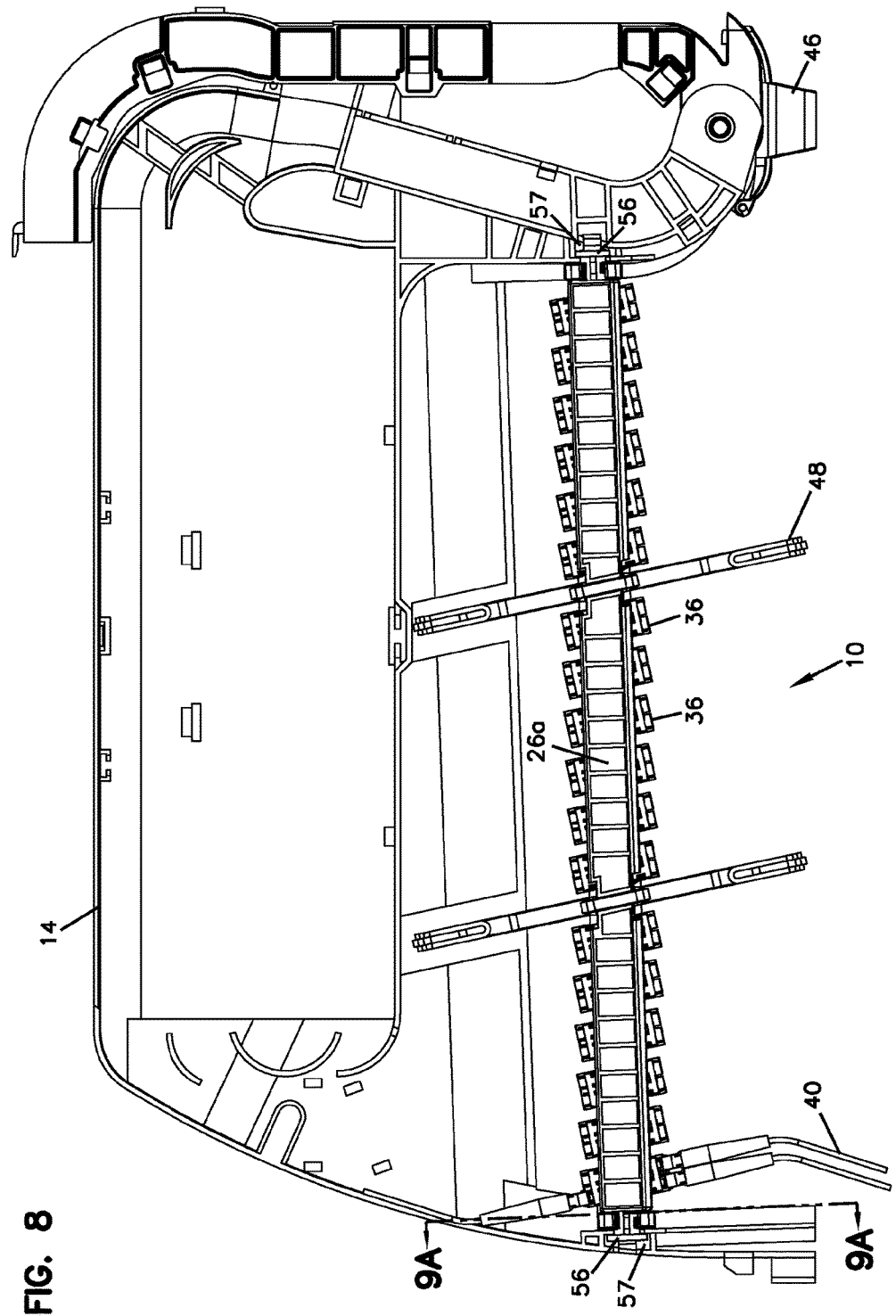
FIG. 8 illustrates the telecommunications panel assembly of FIG. 3 with the upper adapter mounting module of the assembly positioned at a raised configuration from a top view.
Figure 9A:
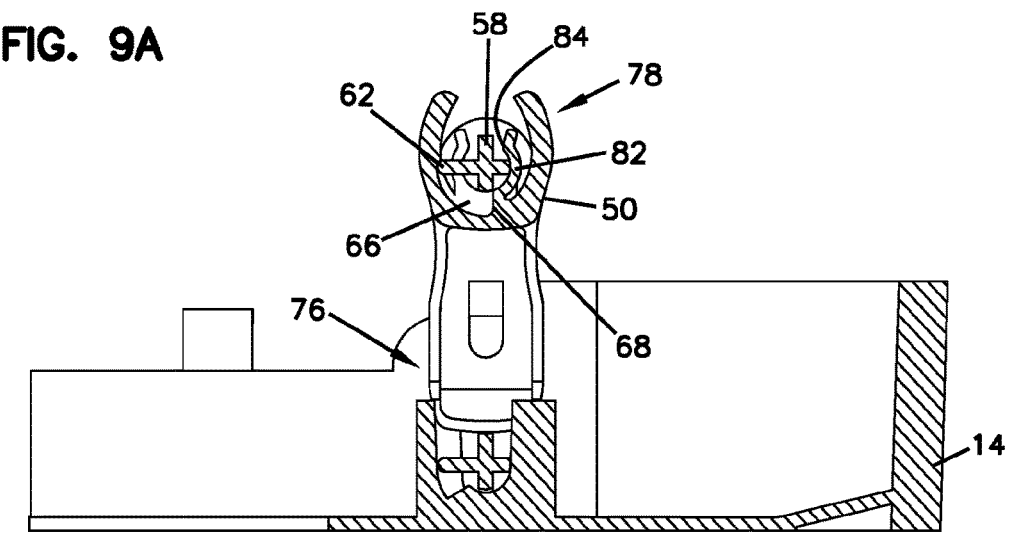
FIG. 9A is a cross-sectional view taken along line 9A-9A of FIG. 8.
Figure 9B:
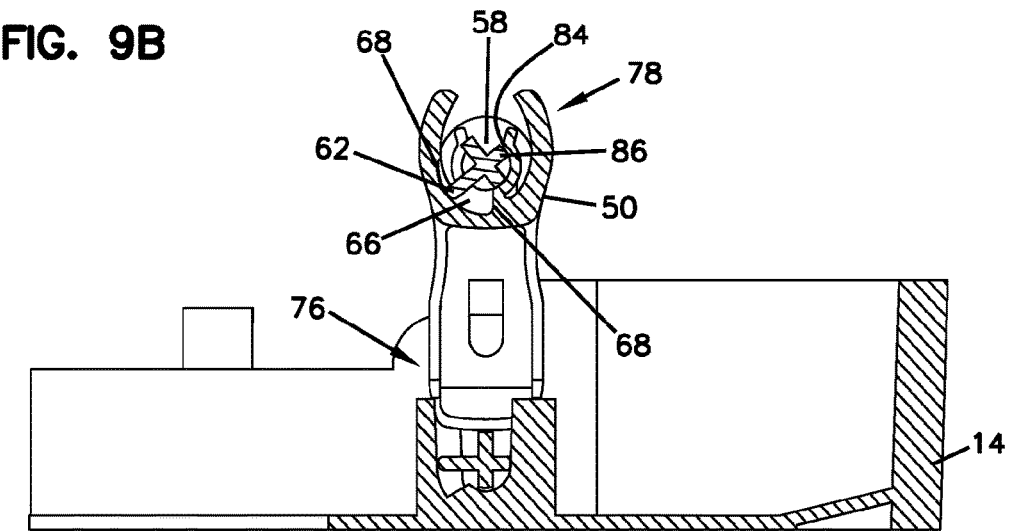
FIG. 9B is a cross-sectional view similar to that of FIG. 9A, illustrating the pivot range of the upper adapter mounting module with respect to the lift supports of the module.
Figure 10:
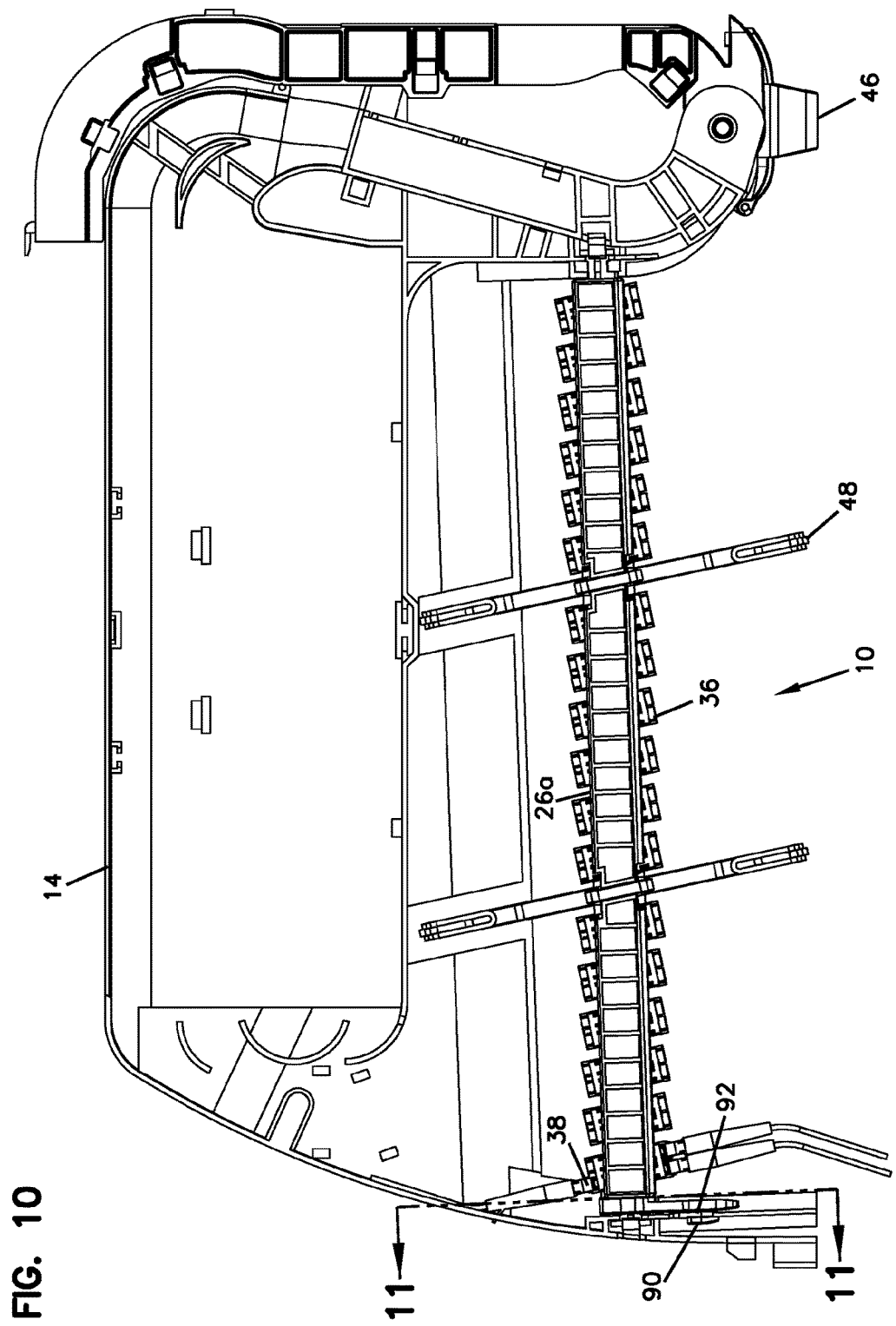
FIG. 10 illustrates the telecommunications panel assembly of FIG. 1 with the upper adapter mounting module of the assembly positioned at a lowered/neutral configuration from a top view.

Referring now to FIGS. 1-12, a telecommunications panel assembly 10 is shown, which defines a plurality of cable termination locations 12. Panel assembly 10 includes a chassis 14 with an open front 16. Chassis 14 includes a main body 18 defining a top 20 (depicted as an open top), a bottom 22, and sides 24. A plurality of adapter mounting modules 26 are mounted to the chassis 14 and are accessible through the open front 16. In the depicted embodiment, the adapter mounting modules 26 are provided in an upper row 28 and a lower row 30. Even though the chassis 14 is shown with two rows 28, 30, other numbers of rows are possible.

Each adapter mounting module 26 includes a frame 32 with a module opening 34. Module opening 34 includes a plurality of adapters 36 mounted therein. Adapters 36 hold mating connectors 38 to allow for fiber optic signal transmission. As shown, the adapters 36 may be mounted at an angle within the module openings 34 for reducing the amount of cable bending as the cables 40 extend toward one of the sides 24 of the chassis 14.

As will be discussed in further detail below, at least one of the adapter mounting modules 26 may be pivotable or rotatable about a pivot axis 42 with respect to an adapter mounting module 26 of a different row, wherein the pivot axis 42 extends horizontally and is defined by a pivot pin 52 of the module 26. In the example embodiment shown, both of the upper and lower modules 26a, 26b are pivotable as will be discussed in further detail below. Please see FIG. 12. The pivotability of the modules 26 improves access to the connectors 38 mounted to the adapters 36 of both the upper module 26a and the lower module 26b.

In one embodiment, panel assembly 10 includes a radius limiter 46 positioned adjacent to one of sides 24 of the chassis 14. The angled mounting of the adapters 36 limit bending as the cables 40 are directed toward the radius limiter 46. In the embodiment shown, the chassis 14 also includes a plurality of cable management fingers 48 extending both forward and rearward from the adapter mounting modules 26. The rear cable management fingers 48 manage cables 40 coming into the chassis 14 for connection to the rear ends of the adapters 36, and front cable management fingers 48 manage cables 40 extending from the front ends of the adapters 36 toward the larger radius limiter 46 at the side 24 of the chassis 14.

As will be discussed in further detail, in addition to the pivoting feature associated with the module 26a of the upper row 28, the upper module 26a may also be liftable with respect to the module 26b of the lower row 30 for improving access to the back side of the lower adapter module 26b. The liftability feature may be reversed with respect to the upper and lower rows. For example, it is contemplated by the present disclosure that the chassis 14 may be designed to have the bottom module 26b lowered with respect to the upper module 26a in order to improve access to the rear connectors 38 of the lower module 26b or the upper module 26a.

Now referring to FIGS. 1-4A, 9A, 9B, 11, and 12, in order to provide both pivotability and liftability for the adapter module 26a of the upper row 28, the telecommunications panel assembly 10 includes a pair of lift supports 50 that are used to support the upper adapter module 26a at a raised position. For sake of simplicity, only the left side of the chassis 14 including a left lift support 50 and the associated features on the left side of the chassis 14 will be discussed, with the understanding that the description is fully applicable to the right side of the chassis 14. Even though the features on the left side of the chassis 14 are fully applicable to the right side of the chassis 14, it should be noted that there may be certain differences between the left and right sides of the chassis and of the adapter modules for aspects such as keying, as will be discussed below.

As shown, the upper adapter mounting module 26a defines a pivot pin 52. The pivot pin 52 extends out from a side face 54 defined by the module 26a. The module 26a is configured to pivot along an axis 42 defined by the pivot pin 52 when the module 26a is in the lowered/neutral position. As will be discussed in further detail, in the depicted embodiment, the adapter module 26a is configured to pivot counterclockwise when looking at the module 26a from the left side such that the adapter ports of the top row 28 are raised upwardly at an angle.

The pivot pin 52 defines a flange portion 56 and a stem portion 58. The flange portion 56 is generally circular and is used to mount the upper module 26a to the chassis 14 when the upper module 26a is positioned at the lowered/neutral configuration.

The flange portion 56 may be slidably inserted into a flange pocket 57 provided on the chassis 14 when mounting the upper module 26a to the chassis 14. It should be noted that the flange portion 56 at the left side of the module 26a (and the corresponding flange pocket 57 of the chassis 14) may include a different configuration than the flange portion 56 at the right side of the module 26a (and the corresponding flange pocket 57 of the chassis 14) for keying purposes. For example, as shown in the top view of the depicted embodiment in FIG. 8, the flange portion 56 at the left side of the module 26a (and the corresponding flange pocket 57 at the left side of the chassis 14) may define a larger cross-dimension than the flange portion 56 at the right side of the module 26a (and the corresponding flange pocket 57 at the right side of the chassis 14) such that the module 26a is only insertable in a single keyed orientation.

Referring back to FIGS. 1-4A, 9A, 9B, 11, and 12, the stem portion 58 of the pivot pin 52 defines a cross-shaped transverse cross-section 60. As will be discussed in further detail below, the cross-shape 60 of the stem 58 provides the ability to lock the upper module 26a at discrete angular positions as the module 26a is pivoted with respect to the lower module 26b when the upper module 26a is at the lowered position. The cross-shaped stem 58 interacts with the lift support 50 to provide the discrete angular locking positions as will be discussed in further detail below.

The pivot pin 52 also includes a stop tab 62 at the base 64 of the stem portion 58, adjacent the side face 54 defined by the module 26a. As will be discussed in further detail below, the stop tab 62 rides within a groove 66 defined on the lift support 50, wherein ends 68 of the groove 66 provide positive stops for the upper module 26a when the module 26a is removed from the chassis 14 and moved to a lifted position using the lift support 50. Please see FIGS. 9A, 9B, 11, and 12.

When mounting the upper adapter module 26a to the chassis 14 at the lowered/neutral position, the flange portion 56 of the pivot pin 52 is inserted into the flange pocket 57, and the stem portion 58 of the pivot pin 52 is inserted into a slot 70 provided at the side 24 of the chassis 14. Once the flange portion 56 is in the pocket 57 and the stem portion 58 is within the slot 70, a flexible latch 72 of the chassis 14 covers the circular flange portion 56 of the pivot pin 52 to retain the module 26a at the mounted position. As shown, the flexible latch 72 defines a finger notch 74 for elastically moving the latch 72 away from the flange portion 56 of the pivot pin 52 in removing the module 26a from the chassis 14.

Now referring to the lift support 50 and the functionality thereof, the lift support 50 defines a mounting end 76 and a pivot end 78. The pivot end 78 is configured to provide the pivotability for the upper module 26a with respect to the lower module 26b. The mounting end 76 is used in mounting the upper module 26a to the chassis 14 in the raised position.

Referring to FIGS. 3, 4, 4A, 9A, 9B, 11, and 12, the pivot end 78 of the lift support 50 is generally C-shaped and defines an opening 80 for receiving the stem portion 58 of the pivot pin 52 of the upper module 26a. Within the opening 80 of the C-shaped pivot end 78 of the lift support 50 are a pair of opposing flexible locking arms 82. The flexible locking arms 82 are configured to interact with the cross-shaped stem portion 58 of the pivot pin 52. The flexible locking arms 82 not only allow pivotability of the upper module 26a along the pivot axis 42 but also lock the upper module 26a at discrete angular positions. As shown, the flexible locking arms 82 define protrusions 84 that abut the legs 86 forming the cross-shaped stem 58 of the pivot pin 52. In this manner, the interaction of the pivot end 78 of the lift support 50 (specifically, the flexible locking arms 82) with the pivot pin 52 of the module 26a provides discrete locking at 45-degree intervals.

When the upper module 26a needs to be moved to a raised position with respect to the lower module 26b for accessing the back side of the lower module 26b, the mounting end 76 of the lift support 50 is used. When the module 26a needs to be raised, the flexible latch 72 of the chassis 14 is moved away from the flange portion 56 of the pivot pin 52, and the stem portion 58 of the pivot pin 52 is taken out of the slot 70. The module 26a, along with the lift support 50, is lifted off the chassis 14. At this point, the lift support 50 is rotated clockwise with respect to the upper module 26a, with the cross-shaped stem 58 of the pivot pin 52 rotating between the flexible locking arms 82 of the lift support 50.

As noted previously, when the lift support 50 is rotated relative to the upper module 26a, the stop tab 62 of the pivot pin 52 of the module 26a interacts with the groove 66 defined on the inner side of the pivot end 78 of the lift support 50. The interaction between the ends 68 of the groove 66 and the stop tab 62 provides positive stops for the upper module 26a as the lift support 50 is pivoted with respect to the upper module 26a. In this manner, a user cannot rotate the lift support 50 past the desired position. The stop tab 62 provides positive stops at positions that are 90 degrees apart to allow a user to move the upper adapter mounting module 26a from a lowered position to a raised position.

Once the lift support 50 has been rotated 90 degrees clockwise with respect to the module 26a, the mounting end 76 is used in mounting the upper module 26a back to the chassis 14, but this time, in a raised position. Thus, instead of the module 26a being directly mounted to the chassis 14 (as in the lowered position), the lift support 50 now essentially acts as an intermediate structure between upper module 26a and the chassis 14 when mounting the upper module 26a at the raised position.

The mounting end 76 of the lift support 50 defines a mounting pin 88. The mounting pin 88 includes a flange portion 90 and a stem portion 92. When the upper adapter mounting module 26a needs to be lifted to the raised position, the stem portion 92 is inserted into the slot 70 of the chassis 14 that was previously used to receive the cross-shaped stem 58 of the module pivot pin 52 (when the module 26a was at the lowered position). The flange portion 90 is once again covered by the flexible latching arm 72 of the chassis 14 in retaining the stem portion 92 of the mounting pin 88 of the lift support 50 within the chassis slot 70.

The stem portion 92 of the mounting pin 88 of the lift support 50 defines flats 94 that abut parallel edges 96 defining the square shaped slot 70 of the chassis 14. The interaction of the flat surfaces 94, 96 keeps the lift support 50 at a vertical position and thus the upper module 26a at a lifted position.

With the upper module 26a at the lifted position, access to the back side of the lower module 26b is facilitated.

If the upper module 26a needs to be lowered again, the steps are reversed. The mounting pin 88 of the lift support 50 is lifted out of the chassis slot 70 after moving the flexible latch 72 out of the way. The lift support 50 is then rotated counterclockwise with respect to the module 26a (limited by the positive stops provided between the groove 66 ends and the stop tab 62) and the stem 58 of the pivot pin 52 inserted once again into the slot 70 to secure the upper module 26a in the lowered position.

As discussed previously, once in the lowered position, the upper module 26a can be pivoted with respect to the lower module 26b along the axis 42 defined by the pivot pin 52 of the upper module 26a. The cross-shaped stem portion 58 of the pivot pin 52 interacts with the flexible locking arms 82 provided at the pivot end 78 of the lift support 50 to provide the discrete 45-degree locking positions. See FIGS. 9A and 9B.

As noted previously, similar structures are provided for the right side of the chassis 14 and the module 26a for the pivotability and the liftability of the upper adapter mounting module 26a.

It should be noted that in certain embodiments, for example, in the depicted embodiment, the lower adapter mounting module 26b is also pivotable with respect to the chassis 14 and the upper module 26a. According to one embodiment, the lower module 26b is pivotable in a clockwise direction, away from the upper module 26a, when viewed from the left side of the chassis 14.

Figure 11:
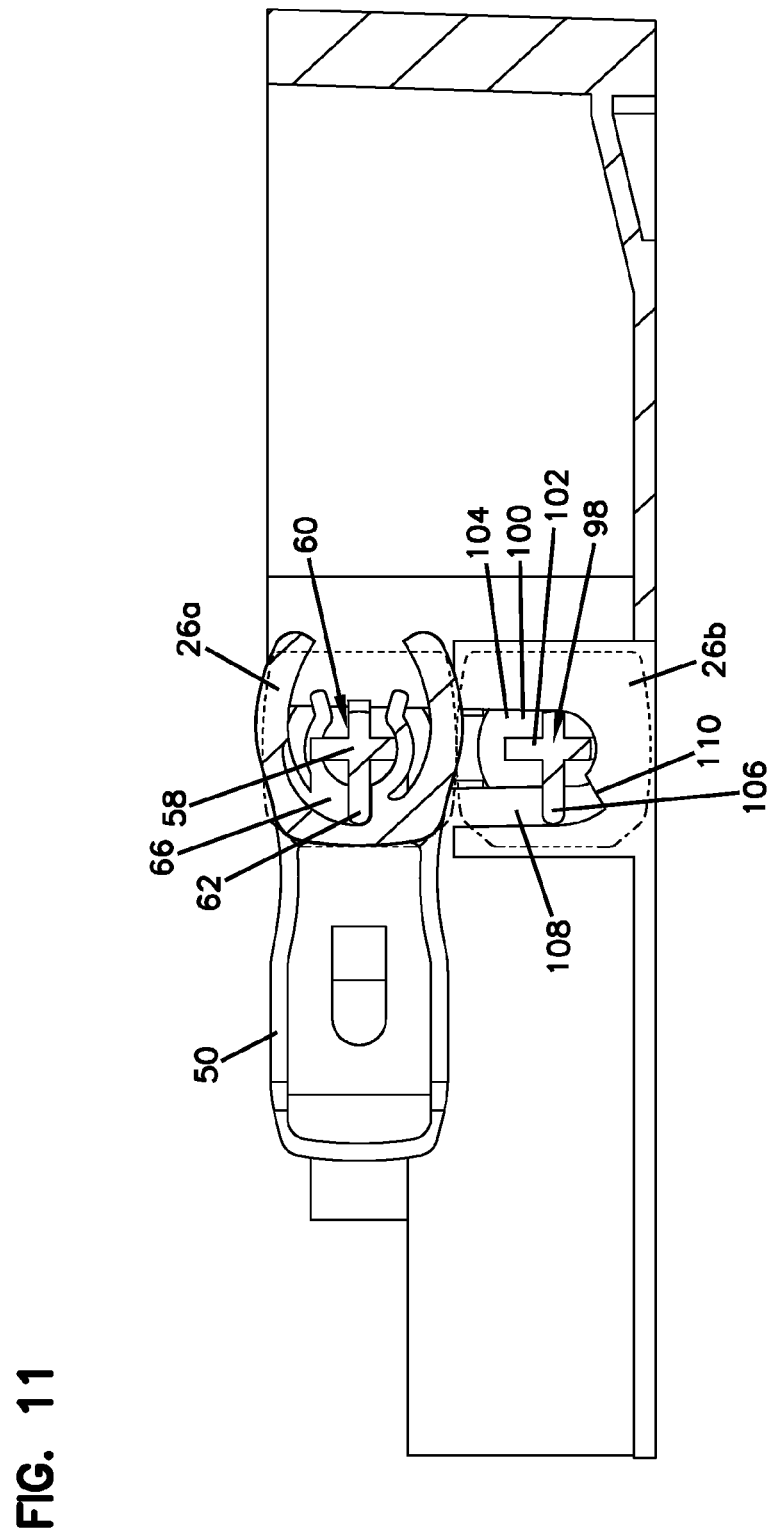
FIG. 11 is a cross-sectional view taken along line 11-11 of FIG. 10.

As shown in the depicted example, the lower module 26b may include similar features to that of the upper module 26b such as a pivot pin 98 and can be mounted to the chassis 14 so as to be pivotable along a pivot axis defined by the pivot pin 98. Similar to that of the upper module 26a, the pivot pin 98 may include a flange portion 100 and a stem portion 102. The pivot pin 98 may be used to mount the lower module 26b to a mounting slot 104 provided on the chassis 14. An example of the slot 104 of the chassis 14 is shown in FIGS. 11 and 12. Similar to that of the upper module 26a, the pivot pin 98 of the lower module 26b may also include a stop tab 106 at the base of the stem portion 102, adjacent the side face defined by the lower module 26b. The stop tab 106, similar to that of the upper module 26a, is configured to ride within a groove 108 defined as part of the mounting slot 104 of the chassis 14 and interact with an end 110 of the groove 108 to provide a positive stop for the lower module 26b. The positive stop is provided for the lower module 26b when the lower module 26b is at a downwardly pivoted position as illustrated in FIG. 12.

It should be noted that the top and bottom surfaces 112, 114 of the upper and lower adapter mounting modules 26a, 26b may be designed with a certain amount of curvature, and the upper and lower modules 26a, 26b may be positioned such that frictional interference between the two modules 26a, 26b may provide simultaneous pivoting motion for the top row and the bottom row, albeit in opposite rotational directions.

As shown in FIGS. 11 and 12, when the upper module 26a is pivoted upwardly, the frictional interference between the bottom surface 114 of the upper module 26a and the top surface 112 of the lower module 26b may cause opposing rotational motion for the two rows. Thus, pivoting up the upper module 26a may simultaneously pivot down the lower module 26b to enlarge the size of the access area and to improve the access to the connectors 38 of both.

Providing the upper module 26a and the lower module 26b with identical or similar features may lead to manufacturing efficiencies and cost savings.

Although the depicted adapters 36 used in the panel assembly 10 of the present disclosure are of LC format, other types of fiber optic adapters 36, such as SC or MPO may be used.

Although in the foregoing description, terms such as "top," "bottom," "front," "back," "right," "left," "upper," and "lower" were used for ease of description and illustration, no restriction is intended by such use of the terms. The telecommunications devices described herein can be used in any orientation, depending upon the desired application.

Having described the preferred aspects and embodiments of the present disclosure, modifications and equivalents of the disclosed concepts may readily occur to one skilled in the art. However, it is intended that such modifications and equivalents be included within the scope of the claims which are appended hereto.

PARTS LIST 10 telecommunications panel assembly
12 cable termination locations
14 chassis
16 open front
18 main body
20 top
22 bottom
24 side
26 adapter mounting module
26a upper adapter mounting module
26b lower adapter mounting module
28 upper row
30 lower row
32 frame
34 module opening
36 adapter
38 connector
40 cable
42 pivot axis
46 radius limiter
48 cable management finger
50 lift support
52 pivot pin
54 module side face
56 flange portion of pivot pin
57 flange pocket
58 stem portion of pivot pin
60 transverse cross-section
62 stop tab
64 base of stem portion
66 groove
68 ends of groove
70 chassis slot
72 flexible latch
74 finger notch
76 mounting end of lift support
78 pivot end of lift support
80 opening
82 flexible locking arm
84 protrusion
86 leg
88 mounting pin
90 flange portion of mounting pin
92 stem portion of mounting pin
94 flats
96 parallel edges
98 pivot pin of lower adapter mounting module
100 flange portion of pivot pin
102 stem portion of pivot pin
104 slot
106 stop tab
108 groove
110 end of groove
112 top surface
114 bottom surface

The invention claimed is:

1. A telecommunications panel assembly comprising:
   a chassis including a front, the chassis further defining a top, a bottom, and two sides;
   a plurality of adapter mounting modules mounted to the chassis at the front, each adapter mounting module including a plurality of fiber optic adapters mounted in a line;
   wherein all of the adapter mounting modules are pivotally mounted about horizontal rotation axes extending parallel to the top and bottom, and transversely to the sides;
   wherein each pivotable adapter mounting module is rotatable in either an upward or a downward direction; and
   a cable guide associated with one of the sides adjacent to the front of the chassis, wherein at least two of the adapter mounting modules define abutting top and bottom surfaces such that pivoting one adapter mounting module automatically pivots the other in an opposite rotational direction via frictional interaction.

2. The assembly of claim 1, wherein the plurality of adapter mounting modules defines an upper module and a lower module, wherein at least one of the upper module and the lower module is pivotable away from the other of the upper module and the lower module and is also removable from the chassis and remountable at a position spaced linearly apart from the other of the upper module and the lower module.

3. The assembly of claim 2, wherein the upper module is pivotable away from the lower module and is also removable from the chassis and remountable at a raised position from the lower module for facilitating access to adapters at a rear side of the lower module.

4. A method of using the assembly of claim 1 wherein one or more adapter mounting modules are pivoted to improve connector access without pulling on front cables connected by the connectors to the adapters.

5. A method of using the assembly of claim 1, wherein one of the adapter mounting modules is pivoted away from another of the adapter mounting modules and is also removed from the chassis and remounted at a position spaced linearly apart from another of the adapter mounting modules.

6. A telecommunications panel assembly comprising:
a chassis including a front, the chassis further defining a top, a bottom, and two sides;
a plurality of adapter mounting modules mounted to the chassis at the front, each adapter mounting module including a plurality of fiber optic adapters mounted in a line;
wherein at least one of the adapter mounting modules is mounted to the chassis with a pair of supports, wherein the supports are mountable to the chassis in two different orientations and are pivotable with respect to the at least one adapter module, wherein the at least one adapter module is removable from the chassis and remountable at a position spaced linearly and directly vertically apart from another of the adapter mounting modules via remounting of the supports with respect to the chassis and via pivotal movement of the supports with respect to the at least one adapter module, such that the fiber optic adapters of the at least one adapter module face in the same direction before and after remounting of the at least one adapter module to the chassis.

7. The assembly of claim 6, wherein all of the adapter mounting modules are also pivotally mounted about horizontal rotation axes extending parallel to the top and bottom and transversely to the sides.

8. The assembly of claim 7, wherein at least two of the adapter mounting modules define abutting top and bottom surfaces such that pivoting one adapter mounting module automatically pivots the other via frictional interaction.

9. The assembly of claim 6, wherein the plurality of adapter mounting modules defines an upper module and a lower module, wherein at least one of the upper module and the lower module is pivotable away from the other of the upper module and the lower module and is also removable from the chassis and remountable at a position spaced linearly apart from the other of the upper module and the lower module.

10. The assembly of claim 9, wherein the upper module is pivotable away from the lower module and is also removable from the chassis and remountable at a raised position from the lower module for facilitating access to adapters at a rear side of the lower module.

11. A method of increasing access to adapters of an adapter mounting module mounted to a telecommunications chassis that defines a front, a top, a bottom, and two sides, the method comprising:
removing an adapter mounting module from the chassis;
pivoting a pair of supports that are mounted at right and left sides of the adapter mounting module with respect to the adapter mounting module, wherein the supports are also mountable to the chassis in two different orientations; and
remounting the adapter mounting module to the chassis via the supports at a position spaced linearly and directly vertically apart from another adapter mounting module that is initially adjacent to the remounted adapter mounting module, such that the adapters of the remounted adapter mounting module face in the same direction before and after remounting of the adapter mounting module to the chassis.

12. A method according to claim 11, wherein the remounted adapter mounting module is also initially pivotable with respect to the other adapter mounting module about a horizontal rotation axis extending parallel to the top and bottom, and transversely to the sides.

13. A method according to claim 11, wherein both adapter mounting modules are also initially pivotable with respect to the chassis about horizontal rotation axes extending parallel to the top and bottom, and transversely to the sides.

14. A method according to claim 13, wherein both of the adapter mounting modules define abutting top and bottom surfaces such that pivoting one adapter mounting module automatically pivots the other via frictional interaction.

15. A method according to claim 11, wherein the remounted adapter mounting module is an upper module, and the upper mounting module is raised linearly with respect to a lower mounting module.

16. A method according to claim 15, wherein both the upper and the lower modules are pivoted away from each other about horizontal rotation axes extending parallel to the top and bottom, and transversely to the sides to facilitate access to the adapters of the adapter modules.

17. A method according to claim 16, wherein pivoting of one of the upper and lower modules away from the other automatically pivots the other module via friction between the upper and lower modules.

* * * * *